US009467481B2

(12) United States Patent
Ray

(10) Patent No.: US 9,467,481 B2
(45) Date of Patent: Oct. 11, 2016

(54) MULTI-ACCESS GATEWAY FOR DIRECT TO RESIDENCE COMMUNICATION SERVICES

(71) Applicant: CenturyLink Intellectual Property LLC, Denver, CO (US)

(72) Inventor: Amar Nath Ray, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 14/340,776

(22) Filed: Jul. 25, 2014

(65) Prior Publication Data

US 2014/0334496 A1 Nov. 13, 2014

Related U.S. Application Data

(63) Continuation of application No. 12/770,180, filed on Apr. 29, 2010, now Pat. No. 8,824,487.

(51) Int. Cl.
  *H04L 12/28* (2006.01)
  *H04L 29/06* (2006.01)
  *H04L 12/70* (2013.01)

(52) U.S. Cl.
  CPC ......... *H04L 65/102* (2013.01); *H04L 12/2898* (2013.01); *H04L 65/1026* (2013.01); *H04L 63/164* (2013.01); *H04L 2012/5618* (2013.01)

(58) Field of Classification Search
  None
  See application file for complete search history.

(56) References Cited

U.S. PATENT DOCUMENTS

| | | | |
|---|---|---|---|
| 6,084,892 A | 7/2000 | Benash et al. | |
| 6,680,998 B1 | 1/2004 | Bell et al. | |
| 7,203,190 B1 * | 4/2007 | Ruban et al. | 370/356 |
| 7,222,190 B2 | 5/2007 | Klinker et al. | |
| 7,882,439 B2 | 2/2011 | Elman et al. | |
| 8,050,386 B2 | 11/2011 | Dickinson | |
| 8,165,560 B2 | 4/2012 | Stenquist | |
| 8,824,487 B1 | 9/2014 | Ray | |
| 2003/0078962 A1 * | 4/2003 | Fabbricatore et al. | 709/203 |
| 2003/0126295 A1 * | 7/2003 | Doherty | 709/249 |
| 2004/0139187 A1 * | 7/2004 | Park | 709/223 |
| 2006/0002407 A1 | 1/2006 | Sakamoto | |
| 2006/0153100 A1 * | 7/2006 | Dube et al. | 370/256 |
| 2006/0209795 A1 * | 9/2006 | Chow et al. | 370/352 |

(Continued)

OTHER PUBLICATIONS

U.S. Appl. No. 12/770,180; Non-Final Rejection dated Oct. 25, 2012; 27 pages.

(Continued)

*Primary Examiner* — Dang Ton
*Assistant Examiner* — Ronald H Davis
(74) *Attorney, Agent, or Firm* — Swanson & Bratschun, L.L.C.

(57) ABSTRACT

Different residences can be communicatively linked to a communication backbone via a multi-access gateway, where each residence comprises an adapter through which a set of IP devices directly connect to the multi-access gateway via IPSec compliant communication channels. The multi-access gateway can connect each of the IP devices to remotely located resources. Telecommunication services can be provided to the IP devices in the residences for fees. The multi-access gateway can controls specifics of the telecommunication services, which can include emergency (e.g., 911) services, home control services, and residential administration services. Any of the telecommunication services can be initiated, modified, or terminated by a carrier maintaining the multi-access gateway on a per residence basis for any of the different residences.

22 Claims, 4 Drawing Sheets

(56) References Cited

U.S. PATENT DOCUMENTS

| | | |
|---|---|---|
| 2007/0082650 A1 | 4/2007 | Zhu et al. |
| 2007/0102527 A1 | 5/2007 | Eubank et al. |
| 2007/0186252 A1 | 8/2007 | Maggio |
| 2007/0287453 A1* | 12/2007 | Wang .................. 455/435.1 |
| 2008/0117902 A1 | 5/2008 | Vinneras |
| 2008/0220813 A1 | 9/2008 | Brown et al. |
| 2009/0060168 A1 | 3/2009 | Corry et al. |
| 2009/0157811 A1 | 6/2009 | Bailor et al. |
| 2009/0180430 A1 | 7/2009 | Fadell |
| 2009/0187970 A1 | 7/2009 | Mower et al. |
| 2009/0240821 A1 | 9/2009 | Juncker et al. |
| 2009/0310602 A1 | 12/2009 | Olshansky et al. |
| 2009/0319896 A1 | 12/2009 | Green et al. |
| 2009/0327435 A1 | 12/2009 | LoGalbo et al. |
| 2010/0005158 A1 | 1/2010 | Savolainen |
| 2010/0165993 A1 | 7/2010 | Basilier |
| 2010/0202450 A1 | 8/2010 | Ansari et al. |
| 2010/0246781 A1 | 9/2010 | Bradburn |
| 2011/0063994 A1* | 3/2011 | Nix et al. ................. 370/254 |
| 2011/0211493 A1 | 9/2011 | Thyni et al. |
| 2012/0124222 A1 | 5/2012 | Noldus et al. |
| 2012/0140719 A1 | 6/2012 | Hui et al. |

OTHER PUBLICATIONS

Technical Report TR-144, Broadband Multi-Service Architecture & Framework Requirements, Issue No. 1.00, DSL Forum, Aug. 2007; 62 pages.

47 U.S.C. Title 47, Chapter 5, Subchapter 1—General Provisions, United States Code, 2011 Edition; 6 pages.

J. Rosenberg, et al., STUN Simple Traversal of User Datagram Protocol (UDP) Through Network Address Translators (NATs), RFC 3489, The Internet Society, Mar. 2003; 48 pages.

U.S. Appl. No. 12/770,180; Non-Final Rejection dated May 22, 2013; 28 pages.

U.S. Appl. No. 12/770,180; Non-Final Rejection dated Nov. 29, 2013; 34 pages.

U.S. Appl. No. 12/770,180; Notice of Allowance dated Apr. 25, 2014; 19 pages.

U.S. Appl. No. 12/770,180; Issue Notification dated Aug. 13, 2014; 1 page.

* cited by examiner

MULTI-ACCESS GATEWAY FOR DIRECT TO RESIDENCE COMMUNICATION SERVICES

CROSS REFERENCE TO RELATED APPLICATION

This application is a continuation of U.S. patent application Ser. No. 12/770,180, filed Apr. 29, 2010 by Amar Nath Ray and titled, "Multi-Access Gateway for Direct to Residence Communication Services", which is hereby incorporated by reference in its entirety.

BACKGROUND

The disclosure relates to the field of residential telecommunication services and, more particularly, to a multi-access gateway for direct to residence communication services.

Residential communication services are generally provided in accordance with an end point architecture. In this architecture, for each service, a "last mile" line is established between the carrier and the residence in question. Different types of services can require different lines. This has historically the case with different types of broadcasting media (e.g., television, wireline voice telephony, wireless voice telephony, Internet services, etc.), where each type of media was provided by different providers. Each different type media has even been regulated by different agencies and governing laws. Telecommunication convergence has lowered many of these barriers, and now multiple different media services can be provided by a common provider over a single external line (wired or wireless). In an end-point architecture, a provider is responsible for connectivity issues to a residence, and intra-residence communications have been the responsibility of a home owner.

For example, broadband internet connections require a user to purchase, deploy, and maintain a home based gateway, such as a router. Each in-residence IP device then uses the home router as a gateway. The gateway is connected to a modem, which is linked to the provider's gateway. This arrangement often results in home users having difficulty setting up their household devices. This difficulty continues to increase, as a number of intra-home devices linked to a gateway increases.

Thus, as IP devices in the home continue to proliferate, architectures dependent upon home routers (e.g., end point architectures) are expected to increasingly experience problems. For example, many residences that receive voice over internet protocol (VOIP) based services experience degradation of service quality due to use of routers, which may fail to provide preferential treatment to voice communications. Video-on-demand and streaming services similarly suffer from improper router configurations and/or from home routers lacking necessary features to provide adequate performance for these services. Problems occurring within the home network (downstream from a home router) often lead to home user dissatisfaction and frustration, with their service provider (i.e., internet or VOIP carrier). Further, service providers incur significant costs to provide technological support, which includes sending agents to homes, for resolving issue beyond their control (i.e., presently providers are largely not responsible for home routers and/or in-home architectures, networking devices, etc.).

One contributing factor of in-residence telecommunication problems is due to providers biasing communication lines for downstreaming (e.g., receiving content from the provider's network) verses upstreaming (sending content from the residence to the provider). The available bandwidth for upstreaming is typically a fraction of that for downstreaming. In residence devices and emerging services that require significant upstream bandwidth (e.g., VOIP devices, in-home media servers like SLINGBOX and WINDOWS HOME SERVER (WHS) devices, security cameras, etc.) can strangle the available upstream bandwidth. Cloud computing services, online backup solutions, and other emerging technologies also consume significant upstream bandwidth. Problems with these devices or services, again lead to decreased user satisfaction with their service provider/carrier, even through often there is little a service provider can do.

Further complications and residence experienced problems result from use of third party services. That is, residences are increasing subscribing to third party services for telecommunications, which require communications with in-residence devices. These services can be implemented in an extremely inefficient manner and/or can consume an inordinate amount of available bandwidth in a non-cooperative way, which results in an end-user experiencing problems. These problems are often not attributed to their proper source (especially when experienced by non-technical users), which results in trouble calls to a telecommunication service provider and/or customer dissatisfaction with the service provider/carrier.

The above problems are often not ones resulting from inherent capacity or performance limitations of a line from a residence to the service provider (the last mile of communications). These problems often result from the home router acting as a bottleneck to the external line and/or by communication conflicts (including prioritization conflicts) occurring among intra-residence devices. Problems of this nature are controlled by intra-home equipment, such as home based gateways.

BRIEF SUMMARY

The disclosure can be implemented in accordance with a variety of aspects and configurations. For instance, one aspect of the disclosure is for providing a method, computer program, system, and artifact for providing telecommunication services. In the aspect, different residences can be communicatively linked to a communication backbone via a multi-access gateway. Each residence can include an adapter through which a set of one or more IP devices directly connect to the multi-access gateway via IPSec compliant communication channels. The multi-access gateway can perform TCP/IP network level routing for the IP devices. The highest TCP/IP level communication performed by the adapter is at the link level of the TCP/IP stack. The multi-access gateway can connect each of the IP devices to remotely located resources, which comprise remotely located IP resources, which communicate to the IP devices via IP addresses maintained by the multi-access gateway. Telecommunication services can be provided to the IP devices in the residences for fees. The multi-access gateway can control specifics of the telecommunication services. The telecommunication services can include emergency (e.g., 911) services for the IP devices, home control services, and residential administration services. Any of the telecommunication services can be initiated, modified, or terminated by a carrier, which maintains the multi-access gateway, on a per residence basis for any of the different residences.

One aspect of the disclosure is for providing a method, computer program, system, and artifact for providing residential telecommunication services. Different internet protocol (IP) devices within hundreds of different residences can be connected to a multi-access gateway through a plurality of in-residence adaptors. Each of the in-residence adaptors can correspond in a one-to-one fashion to each of the hundreds of different residences. Each adaptor can be customer premise equipment (CPE) lacking routing capabilities. The adaptor can be positioned inside the residence or outside the residence (e.g., in a locked box only accessible by a service provider and not by the residents). Each of the adaptors can be communicatively linked to a remotely located multi-access gateway. The multi-access gateway can be part of the middle-mile of a communication network. The multi-access gateway can provide routing directly to IP addresses of each of the IP devices without any intermediate gateways. TCP/IP based communications can be conducted between each of the IP devices and the multi-access gateway. The communications can occur through the adapters at the link level of the TCP/IP stack, where the conducted TCP/IP based communications through the adaptor do not occur above the link layer of the TCP/IP stack. A carrier controlling the multi-access gateway can provide telecommunication services to residential subscribers of the residences for fees. Customizable residence specific settings can be stored for each of the residences in a data store accessible by computing equipment able to control residence specific behavior of the multi-access gateway. The customizable residence specific settings can determine details of the telecommunication services as provided to specific ones of the residences. A user interface accessible by client-side browsers can be provided. The user interface can permit authorized users to modify at least a portion of the customizable residence specific settings for the one of the residences in which the authorized user resides.

DETAILED DESCRIPTION

Figure 1:
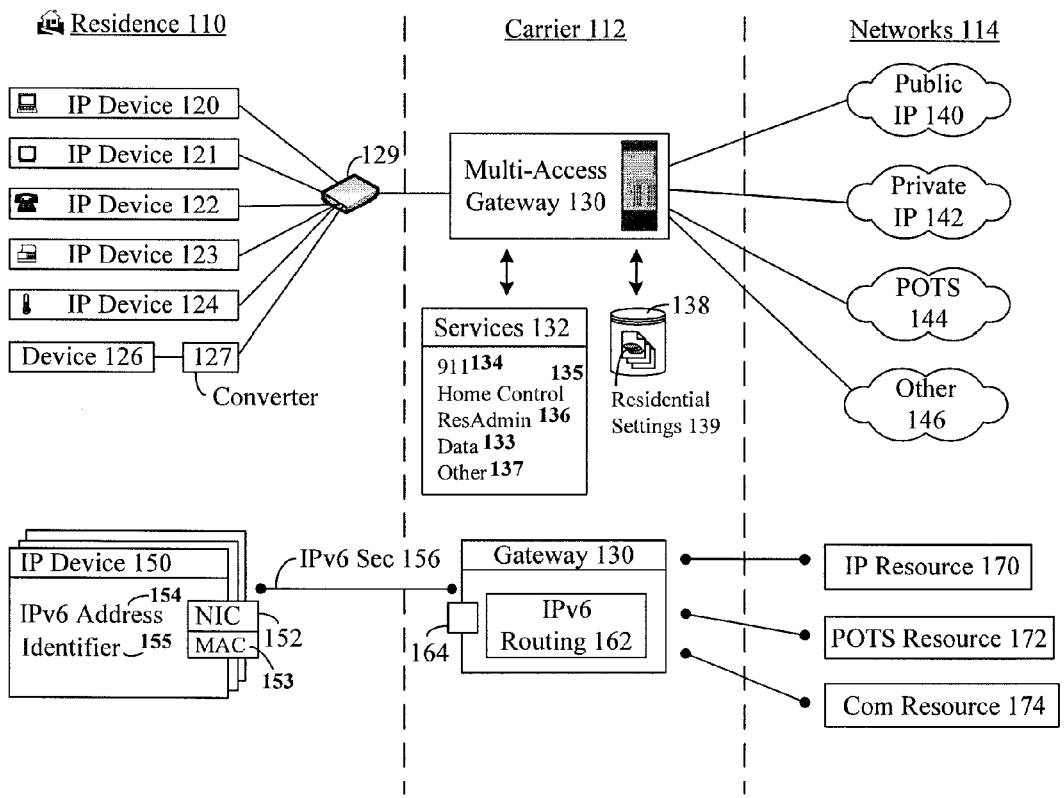
FIG. 1 is a diagram of a telecommunications system using a multi-access gateway for residential communication services in accordance with a disclosure.
Figure 1:
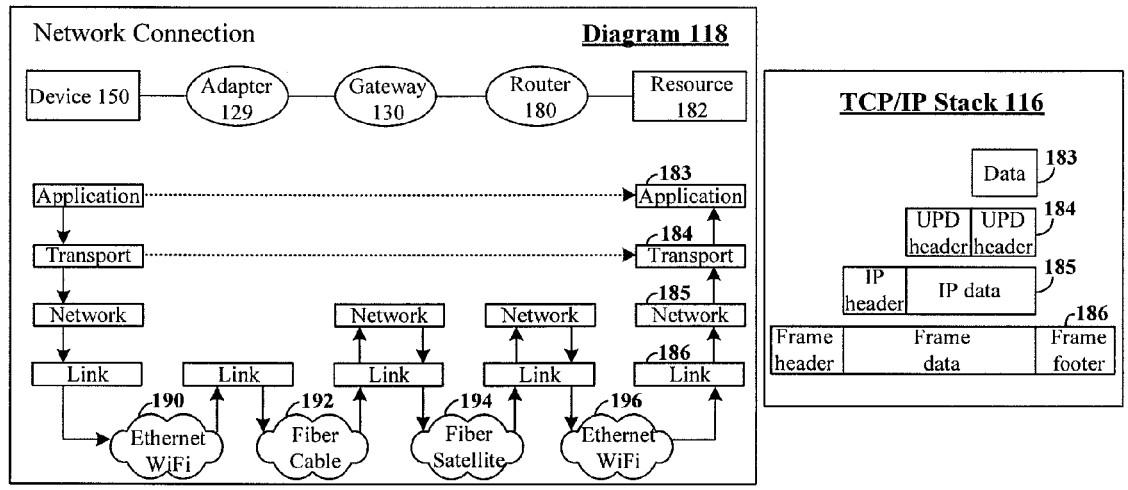

The present disclosure eliminates a need for home based gateways by establishing a multi-access gateway at a carrier's location. That is, the multi-access gateway is not positioned within the last mile, but can instead be positioned at the edge of the middle-mile, in a communication network. This multi-access gateway can perform routing functions for tens or hundreds of thousands of in-residence devices. Within a residence, a single, non-routing adaptor (e.g., a modem) can be installed, which links the in-home devices to the multi-access gateway. Converters, which include a network transponder able to connect to the adapter, can be optionally used to enable non-IP devices (e.g., POTS phones) lacking an internal network transponder to function.

In an embodiment of the disclosure, each in-residence device can be assigned a unique IP address (an IPv6 address, for example), which the multi-access gateway uses when routing communications. Communications between each in-residence device and the multi-access gateway can be secure communications, such as conforming to the IPSec standard. A number of services, such as emergency (e.g., 911) services, home control services, residential administration services, and the like can be implemented at the multi-access gateway for the residences. Use of the multi-access gateway is more cost efficient compared to the aggregate costs of providing in-residence home gateways. Additionally, a service provider/carrier is granted increased control of communications all the way to the end-user device, which permits intelligent and controlled use of available bandwidth of physical communication pathways (which includes wirelines and wireless spectrum).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a diagram of a telecommunications system 100 using a multi-access gateway 130 for residential communication services 132 in accordance with a disclosure. System 100 represents an application of telecommunication technologies that utilize network-based gateway architecture, as opposed to an endpoint architecture that is commonly today. In system 100, functionality typically implemented within home based gateways, such as customer premise equipment (CPE) routers, can be replaced by functionality (e.g., routing 162 functionality) of the multi-access gateway 130.

Thus, the gateway 130 can communicate with a variety of in-residence (110) network devices 120-126 through adaptor 129 using an internet protocol (IP) addresses 154. In one embodiment, the IP address 154 can be a public, static address, such as an IPv6 address. In another embodiment, the IP address 154 can be a dynamic private address assigned by gateway 130 as needed. IP address 154 can also be a partial IP address 154 in one embodiment, which is assigned and able to be uniquely identified by gateway 130, which performs routing functions in system 100. Regardless of the type of address 154 used, the arrangements shown in system 100 can result in a substantial reduction of overall costs, as home based gateways (e.g., CPE routers) are in aggregate more expensive to procure, setup, and maintain than the gateway 130—yet gateway 130 is able to provide equivalent to superior functionality compared to the aggregated home-based gateways. Further, gateway 130 permits a carrier 112 to exert more fine-grained control over residential services 132, which can result in residential (110) customers being able to receive a greater variety of services 132 at lower costs due to economies of scale. Further, service providers can be provided opportunities at larger markets and carriers 112 can be granted new avenues to leverage their assets.

To elaborate, in system 100, IP devices 120-124 in a residence 110 can be connected through an adaptor 129 to a carrier's 112 multi-access gateway 130. Each IP device 120-124 (shown also as device 150) can include a network interface card (NIC) 152 with a unique Media Access Control (MAC) address 153. Further, each device 150 can be assigned an IP address 154 (static or dynamic; public or private, depending on implementation choices) as well as an optional hardware device identifier 155. In one embodiment, the IP address 154 can be an IPv6 address, which permits substantially greater unique addresses than previous standards. In one embodiment, the hardware device identifier 155 can be used for hardware-mating services, so that services lacking the identifier 155, even if they are assigned the correct IP address 154 will not be able to communicate with media access gateway 130. This optional, additional level of security permits tight control of certain ones of the services 132, which may be a requirement of a service provider (such as television, on-demand, and/or pay-per-view providers, which often are contractually bound to only provide media over highly secure channels, which may require hardware-mating, and/or hardware based security schemes.).

Additionally, one or more non-IP devices 126 can connect to adaptor 129 through a converter 127, where the converter 127 can include a network interface connector (NIC), MAC address, and the like. One or more converters 127 can optionally be built into the adaptor 129. A residence 110 (or even a set of multiple residences 110, in one embodiment) only requires a single adaptor 129, although use of additional adaptors 129 for fault tolerance (or bandwidth enhancement) purposes are contemplated.

Residence 110 is used generically throughout this disclosure to refer to a site in which adapter 129 is positioned. In one embodiment, a residence 110 can refer to a unique and independent household, which functions as a domicile for a family of one or more people. Different residences 110 are independent of other residences 110. Despite this independence, hundreds to thousands of residences 110 can be served by a single multi-access gateway 130. This situation is to be contrasted with business or entity owned properties, which are often served by a company determined infrastructure. The telecommunication services 132 provided to the residences 110 can fall under one or more federal statutes (e.g., Telecommunications Act of 1996). Embodiments of the disclosure are meant to include definitions for residential telecommunication service provided within any federal or state statute for regulatory purposes.

Each device 150 can be communicatively linked to the gateway 130 through IP connection 156, which can be a private channel between device 150 and gateway 130, can be a secure IPv6 connection, or can be an IPv4 connection that implements IPSec standards. The connection 156 can have one endpoint (NIC 152) at device 150 and the other (endpoint 164) at gateway 130. In one embodiment, the connection 156 can comply with IPSec standards. Gateway 130 can use routing component 162 to route communications between device 150 and IP resources 170, Plain old telephone service (POTS) resources 172, and/or other communication resource 174. The IP resource 170 can be a resource of a public 140 or private 142 IP network. POTS resource 172 can be a resource of POTS network 144. A communication between gateway 130 and a POTS resource 172 can be circuit-based.

Communication resource 174 can be a resource of other network 146. The other network 146 can include any type of signaling network, which can be directed to IP device 120 within an IP based communication. Other services 137 can include services specifically designed to permit access to other resources 174, which a sufficient quantity of residences 110 desire to justify expenditures of providing these resources 174 as a service 137. Additionally, services 132 implemented at the gateway 130 can be linked to the middle-mile of the communication network, as opposed to the last mile. Thus, these services 132 can have substantially greater bandwidth available to them compared to those which travel to the more bandwidth constrained devices 120-126 over the last mile of the communication network.

This emphasizes that economies of scale achieved through use of the multi-access gateway 130 can open new markets for communication services 132, enriching service providers, residences (110), and carriers 112 alike. Some of the services 132 besides the other services 137 contemplated in system 100 include emergency (e.g., 911) services 134, home control services 135, residential administration services 136, and data services 133. The emergency services 134 can represent emergency services, which can be initiated from any of the IP devices 120-126 or even from the adaptor 129, itself. Previously configured messages (in settings 139) can be triggered as part of emergency services 134, as can automatically providing and confirming address information, and the like. The emergency services 134 can be triggered manually by a user action and/or automatically by in-home conditions determined home based sensors. These home based sensors can be ones utilized by one or more home control services 135.

Services 132 can interoperate with each other, and can optionally share and utilize a common set of residential information 139 maintained in a data store 138 accessible by the gateway 130. In one embodiment, particular datum elements (139) of data store 138 can be protected or kept confidential per residence 110 configurable settings (via administration services 136) to ensure residential information is confidentially, securely, and appropriately maintained. Services 132 include carrier 112 provided services as well as third-party services. In one embodiment, the carrier 112 may be able to offer residents (110) favorable rates on third party services 132, largely to economies of scales and resulting efficiencies achievable by use of the multi-access gateway 130 for implementing residential 110 routing functions.

Diagram 118 shows device 150 can be connected through adaptor 129, through gateway 130, through an optional remote router 180, to resource 182 (which can be any of resources 170-174). Looking at a TCP/IP stack 116 stack for the connections of diagram 118, it can be seen that the device 150 and the resource 182 can each connect through the application 182, transport 184, network (e.g., internet) 185, and link 186 layers. The adaptor 129 communicates at the link 186 layer (or the physical and data Link layers using the OSI model). The gateway 130 and the optional router 180 communicate at the link 186 and network 185 layers. The TCP/IP stack 116 layers are shown for convenience and equivalent layers of other communication stack models are to be considered within scope of the disclosure.

Diagram 118 shows that the data link layer of the TCP/IP stack 116 is the lowest defined layer, which by design is hardware independent. Thus, TCP/IP can be implemented on top of virtually any hardware networking technology in existence. Consequently, any of a variety of different physical network architectures 190, 192, 194, 196 (e.g., Ethernet, Token Ring, hub, repeater) can be implemented to connect the hardware components of device 150, adaptor 129, gateway 130, router 180, and resource 182. The processes of transmitting and receiving packets on a given link (link layer 186) is able to be controlled by software device drivers for network cards (eg., NIC 152), by firmware, or by specialized chipsets. Any of these can perform the data link functions, such as adding and preparing frames header, data, and footers and transmitting these frames over a physical medium.

The network layer 185 solves the problem of sending packets across one or more networks. Internetworking requires sending data from the source network to the destination network, which is the process of routing. As noted gateway 130 is component connected through adapter 129 to device 120-126, which performs the routing function (e.g., routing 162), which is why diagram 118 shows network layer 185 communications for gateway 130 and not for adaptor 129.

In the event that two devices 120-126, which may or may not reside in the same residence 110, are communicating with each other via gateway 130, the optional router 180 shown in diagram 118 can be replaced with adaptor 129. When communicating devices 150 are in a single residence 110, a single adapter 129 can be used. When devices 120-126 in different residences 110 communicate, then a second adaptor 129 can be utilized. Either way, both adaptors 129 will only communicate at the link layer and all routing (e.g., routing component 162) will be performed by the gateway 130. Optimizations can be optionally implemented to expedite communications.

Alternatively (and as shown in diagram 118), an in-residence device 120-126 connected to gateway 130 can connect to a network (e.g., network 114) resource 182 (e.g., resource 170-174). This resource 182 can be connected to a router 180, which may be a carrier-grade router, a business-grade router, or even a home router. Either way, the communication from device 150 will be routed to resource 182, which can respond back (using TCP/IP standards, for example), by traversing the network connection pathway shown in diagram 118 in reverse.

The network 190 between device 150 and adaptor 129 is an in-residence network, which can utilize wireless or wireline communication pathways, as is network 196. Wiring of the network 190 can be adapted for specific home devices 150, such as CPE phones, televisions, security cameras, radios, photo-frames, MP3 players, game consoles, and the like.

The specific wireless or wireline pathways connecting a device 150 to the adaptor 129 can conform to any of a variety of communication standard, including but not limited to BLUETOOTH, WIRELESS USB, Wi-Fi (any of the 802.1x family of protocols), power line communications (e.g., HOMEPLUG), ZIGBEE (and other mesh network communication technologies), Z-WAVE, POTS phone lines (i.e., over Cat 3 wires), Ethernet (i.e., over Cat 5 or 6 wires), USB, FIREWIRE, ESATA, and the like. Traditionally, the devices 150 in residence 110 and the communication lines and protocols used by them fall into the category of CPE and CPE-based wiring. Typical CPE components, such as device 150, can conform to home or business class equipment standards.

Network 192 is a network connecting a residence 110 to a carrier 112. This type of network can be referred to as a last mile (mobile mile or wireless local look in the case of wireless telephony), a local loop, or a subscriber line. Thus, network 192 connects a residence to an edge of a carrier's 112 network. Network 192 can be an Integrated Service Digital Network (ISDN30) connection delivered through copper of fibre cable. Additionally, Worldwide Interoperability for Microwave Access (WiMAX), Broadband over power line (BPL), and other such technologies can be used for providing the last mile services of network 192. Communications over network 190 and/or network 192 may be conducted within discrete channels, which have not been multiplexed with other channels at a content level (e.g., simple signal processing techniques can extract each discrete channel, and can extract a single discrete channel without having to extract others.).

Network 194 can represent the middle-mile connecting the carrier's core network (networks 114) to the local network plant (the beginning of the last mile, where the local loop begins). Network 194 can include the backhaul network. Communications over network 194 will typically be multiplexed at a content level with other communications (e.g., complex signal processing techniques may be need to extract a single channel, which requires multiple channels be de-muxed before a single desired one can be extracted). Network 194 (as shown) also includes the backbone network (e.g., network 114), which ultimately connects to a router 180 (which is positioned within a local loop). Network 196 can be the local network between the router 180 and resource 182. In some embodiments, the resource (e.g., resource 170, 172, 174) linked to device 150 can be implemented close to the network backbone or close to gateway 130 for improved performance, such as performance needed for many popular services 132.

It should be emphasized that system 100 permits the multi-access gateway 130 to control communications between devices 120-126 in a residence 110 at a configurable level of granularity, which provides substantially greater control than available for existing systems. One level of control can exist on a per channel (e.g., IPv6 Sec channel 156) basis. These per device channels can be selectively throttled (bandwidth limited), suspended (then reinitiated from the suspended state), disabled, and the like. For example, when an in-residence 110 security incident or emergency event is detected, non-essential channels can be halted to ensure maximum throughput exists for those devices 120-126 involved in handling the security incident/emergency event. Additionally, in one embodiment, procedures can be implemented within the multi-access gateway 130 (for security purposes) to change the IP addresses 154 of each device 120-126 in a predefined timely fashion controlled by the multi-access gateway 130 and computerized procedures built therein.

In one implementation of system 100 that uses IPv6 communications, a certain block of IPv6 addresses can be assigned to each multi-access gateway 130. A computerized system can then assign the addresses in the block to different channels of different ports of the multi-access gateway 130, where the ports are connected to various ones of the devices 120-126. A database of the gateway 130 can be maintained and upgraded to ensure the ports of the gateway 130 are matched to corresponding ones of the devices 120-126. As devices 120-126 are removed, the ports and/or IP addresses used can be returned to the block, where they can be reassigned by the multi-access gateway 130 to new/different devices 120-126 in the future. The size of the block of addresses assigned to the gateway 130 can be increased whenever gateway 130 capacity increases. In one embodiment, procedures can be implemented to change IP addresses associated with ports and devices 120-126 in a predefined, timely fashion for purposes of enhancing security.

In one embodiment, a software implemented push can be implemented for communications between the devices 120-126 and the multi-access gateway 130. The push can utilize queuing techniques and prioritization techniques to ensure the most critical information is conveyed between residence 110 and gateway 130 in a timely fashion. Procedures can be implemented for manual as well as automated interruptions of pushes as required. For example, a push can be interrupted for a substantial amount of time upon identification of an appropriate emergency event. Additionally, functionality to restart (resume), reinitiate, or continue normal operations can be implemented. For example, a restart of a push can be controlled automatically following resolution of an emergency condition.

The various IP devices 120-126 can have active and idle states. In one embodiment, an indicator (audible/visible) can be provided on the devices 120-126 to display to a user a state of the IP device 120-126 (active/inactive), a connection state (active, suspended, inactive), a status of messages (delivered, queued, disabled), and the like. In one embodiment, the device 120-126 specific display data can be accessed from a display of the adapter 129, or via a user interface that is provided as part of the residential administration services 136. A level of details available through a device status display can vary from device to device. Thus, some devices 120-126 can include a basic state (connected, idle, active, inactive), while others will include more robust indicators. Devices 120-126 can also include special controls/indications for initiating and/or receiving notice of emergency situations.

The devices 120-126 and administration thereof (via residential administration services 136) can be tailored for specific users of the residence 110. For example, every member of a family (living in residence 110) can have their own password (and optional user id) for accessing the administration services 136 and associated user interfaces. Different users can have different user privilege levels, so that a parent can override settings established by a child, for example. User privileges can be used to permit online changing of configuration (residential settings 139) for specific operations, devices 120-126, for maintaining privacy of data (conveyed during communications or within metadata about communications), and the like.

In other words, database 138 can be controlled by multiple different users (e.g., parents in one example) of a residence 110. The control of residential settings 139 can be performed locally (using in-residence 110 controls) or remotely. A procedure can be implemented for the multi-access gateway 130 for giving an audible/visible "busy" indication to other authorized database controllers (e.g., users). That is, residential settings 139 can be locked during editing (or checked in and out) to prevent contention issues. The busy or in-use signal can provide an administrator with feedback that another is changing residential settings 139. In one embodiment, a super user (e.g., main administrator) can request messages be sent to him/her when any residential settings 139 are changed (i.e., the administrator can receive and email message whenever setting 139 changes occur).

Access to database 138 information, such as residential settings 139 can be interrupted or prevented upon identification of an emergency or high priority event. A priority of an event can be determined by a separate database (from database 138) in one embodiment. Also, device 120-126 usage can be halted when residential settings 139 are being changed, which may require the device 120-126 be restarted, reconnected, or otherwise reset before changes reflected in settings 139 can be implemented.

Previously non-available emergency procedures can be implemented for system 100. For example, in one embodiment, the adapter 129 can be equipped with an auto dialer for making an emergency call. Upon receiving an indication of an emergency (from a user or connected device 120-126), the adapter 129 can get a dial tone from the gateway 130 (or from an alternative line connected to adapter 129 and reserved for emergencies) and can dial out 911 or other number to provide emergency services.

In one embodiment, system 100 can pre-store an address for residence 110 (within adaptor 129, device 120-126, and/or data store 138) as well as audio, text, and video information. A procedure associated with the emergency services 134 can be implemented to feed this stored information during a 911 call or other emergency service 134 invocations. In one embodiment, when devices 120-126 and/or adapter 129 include emergency service information (which is able to be manually or automatically fed responsive to an emergency call), an indication of success or a lack of success for uploading the emergency information can be presented upon the appropriate device 120-126 and/or adapter 129.

In one embodiment, a procedure and/or actuator to initiate (e.g., dial out) 911 or other emergency calls can be placed in any of the home devices 120-126. These procedures can include overriding existing usages of the device 120-126 to display emergency information and/or to interact with a user concerning an emergency situation. For example, an IP device 121 that is a television can be overridden so that a user is informed of an emergency situation and is prompted with a set of pre-configured responses to initiate via a TV remote control unit. In one embodiment, a dial-out device (e.g., a phone or other audio transducer) can be connected to any of the devices 120-126 through an appropriate connection (e.g., an USB port, for example). In such an embodiment, the multi-access gateway 130 can provide a dial tone to the appropriate connected home device for dialing out 911, upon indication of an emergency event. For example, an internal intercom system can be provided a dial tone and used to dial out during an emergency event in one embodiment.

Further, master and slave devices 120-126 can be defined per residence 110 for emergency services 124 to avoid multiple emergency call outs from within the same household or residence 110. Alternatively, an indicator presented on the devices 120-126 that indicates an emergency service has been initiated can also help avoid excessive and duplicative call-outs during an emergency situation.

In one embodiment, an automated report about one or more emergency events can be generated and provided to an account Web page. This report and/or information can be shared by all household users. Depending on the severity and type of emergency event, a text message or email can also be sent to a master controller's (super user) mobile phone or other designated receiving devices. Emergency events can be defined as part of the residential settings 139 and/or can be defined by the gateway 130 and its administrators. In one embodiment, an additional Web site can be used to present residence 110 specific information to responders for an emergency event. The residence information 110 can be gathered from in-residence 110 sensors, data feeds, and the like and provided to responders in real-time or near real time.

System 100 can provide any number of different customizable procedures for uploading and otherwise storing emergency location information into one or more of the devices 120-126 on the premises (residence 110). Standard formats can be used for different emergency messages, which include audio content, text, audio, and other media. Versions of this emergency information can be stored on the gateway 130. Upon receiving an indication of an emergency event, the multi-access gateway 130 can take appropriate actions. For example, the gateway 130 can send a specific set of pre-stored messages with location information of the calling party to an emergency responder. The data store 138 containing customer information (including settings 139) (e.g., name, address, etc.) that is indexed against household connection port can be used. In one embodiment, when a port to a residence 110 device is unexpected severed, as detected by gateway 130, and emergency action can be automatically initiated by gateway 130.

Figure 2:
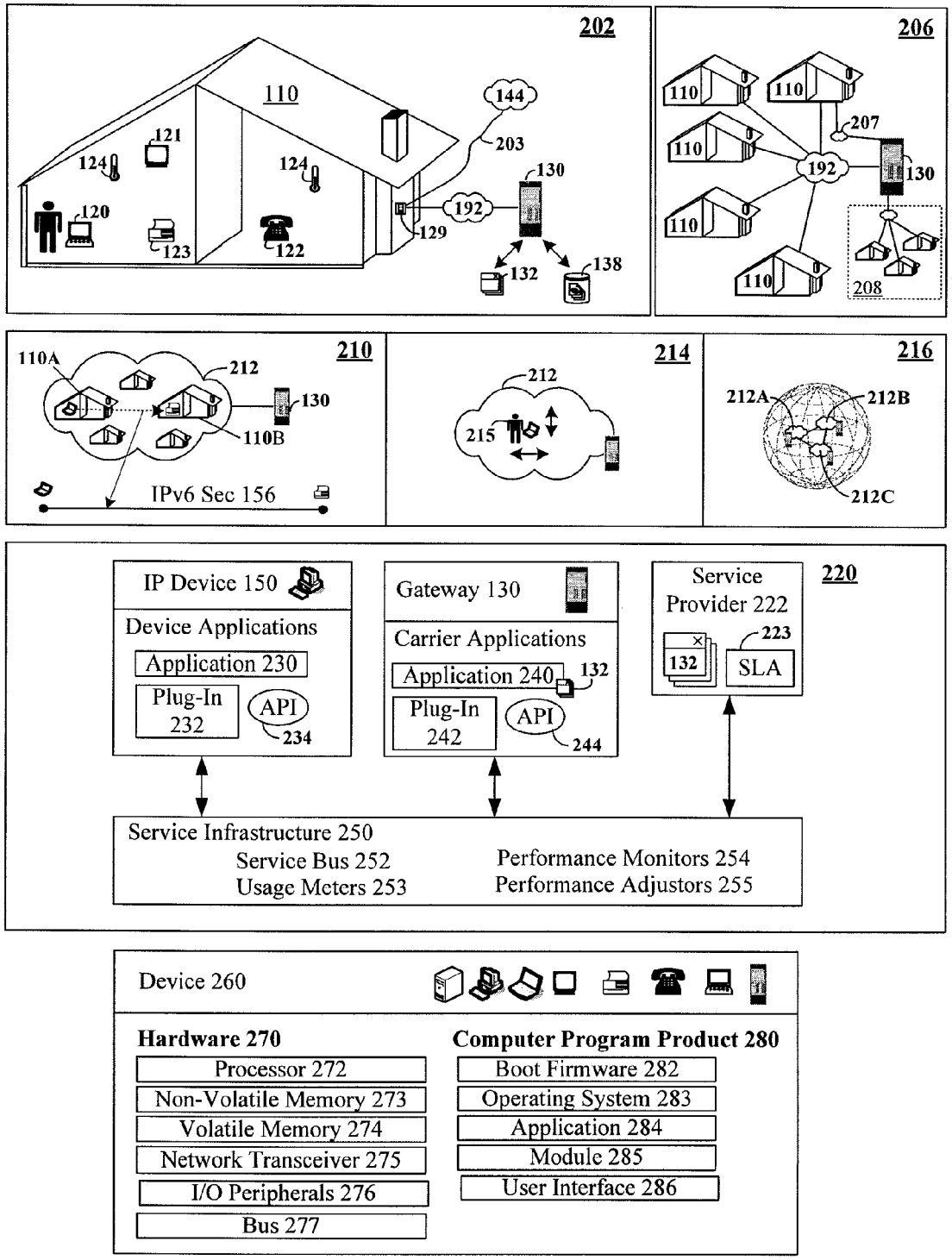
FIG. 2 provides additional views and diagrams for embodiments of the telecommunications system of FIG. 1.

FIG. 2 provides additional views and diagrams for embodiments of system 100. Diagram 202 shows a residence 110 view, where the residence 110 includes multiple devices 120-124 positioned in different rooms. Each device 120-124 can be communicatively linked to the residence's adaptor 129, via wireless or wireline pathways (i.e., is connected via network 190). In one embodiment, only one adaptor 129 is needed to support a residence 110 regardless of the number of devices 120-124 or rooms of the residence 110.

The adapter 129 can be intended for residence access (physically) and placed inside the residence 110, in one embodiment of the disclosure. In another, the adapter 129 can be placed on the exterior of the residence 110, and physical access may be restricted to carrier personnel. For example, the exterior positioned adapter 129 can be placed inside a locked box, which only agents of the carrier 112 possess keys to (i.e., residents may lack direct access to the locked box).

The adapter 129 can be linked to the multi-access gateway 130 via network 192. Services 132 can be provide through the gateway 130 as can access to a data store 138, which includes residential settings 139. In one embodiment, one or more communication pathways 203 can exist from adapter 129 to network 114, such as POTS network 144, which do not pass through the gateway 130. Communication pathway 203 can be used for emergency services 134 and/or can be utilized as a communication failsafe or fall back. Communication pathway 203 may be provided by a different carrier 112, than that which provides gateway 130. Communication pathway 203 may permit circuit based or packet switched communications. Further, pathway 203 can use a wireline or wireless medium for communicating data.

Diagram 206 shows that multiple residences 110 are connected via a single network 192 to the gateway 130. More than one distinct last mile network linked to a different set of residences 110 can be connected to the same gateway 130, as expressed by the last mile network 208 also being connected to gateway 130. Further, one or more residences 110 may connect to the gateway 130 via more than one network. For example, network 207 can be an additional last mile network distinct from network 192, which connects one or more residences 110 to the gateway 130. Use of multiple networks (i.e., a WiMAX network and a copper network, for example) can provide a level of redundancy, which may be useful in ensuring residences 110 experience a desired threshold of uptime. It is also a means of increasing bandwidth to one or more residences, as well as a means for leveraging different fixed assets available to a carrier 112. In one embodiment, an adapter 129 can support multiple different protocols (wireline and wireless) connecting a residence 110 to the gateway 130. A residence 110 receiving services 132 may not even be aware (or care) which of a set of one or more physical networks and link-layer 186 protocols are being used for communications between the gateway 130 and adapter 129.

Diagram 210 shows a residential network 212, which includes a set of residences 110 served (receiving routing 162 functionality from) by a common gateway 130. Since the same gateway 130 controls the routing of communications, it can permit (assuming permissions are granted by residences as recorded in residential settings 139) a device 150 positioned in one residence (e.g., residence 110A) to communicate with a device 150 in another residence (e.g., residence 110B). Communications can be conducted securely, such as in compliance with IPSec 156 standards. Thus, different family members (or friends) in the same neighborhood (or within the same residential network 212) can utilize each other's devices 150, in accordance with permissions established by the residential settings 139. Thus, a person using a computer in residence 110A can print a document to a printer located in residence 110B.

The capability of sharing access to network attached devices 120-126 over a residential network 212 can be considered a service 132 (e.g., other service 137) provided by the carrier 112. Notably, communications between different residences 110A and 110B in the same residential network 212 can be substantially equivalent (from a technology viewpoint) as permitting communications between two devices 150 in the same residence 110. The routing in both cases, is controlled by gateway 130 and is between devices 150 having unique IPv6 Addresses 154. Any desired level of access control and restrictions to devices 150 managed by gateway 130 can be implemented.

Diagram 214 shows that a person 215 using a mobile device can move about a residential network 212 without losing connectivity. That is, internet level 185 settings need not change, since the same gateway 130 is being used by the device 150 (having a stable IP address) regardless of where in the residential network 212 a person 215 is located. It should be noted, that physical level and link level 186 handoffs may be required within network 212, as the person 215 moves about. That is, different adapters 129 positioned within different residences 110 may be used, such as when the communication is Wi-Fi (802.11) based and the adapters 129 include a Wi-Fi transceiver. Security is not compromised even though different adapters 129 are used, as communications between person 215 and gateway 130 can be secured by IPSec 156. In one embodiment, geofences can be implemented to limit a person's 215 communication capability within residential network 212. Similarly, an ability to roam within a residential network 212 can be provided as an optional service 132 (e.g., other service 137) available to subscribers.

Diagram 216 illustrates that different residential networks 212A, 212B, 212C can exist in different geospatial positions. Each of the residential networks 212A, 212B, 212C can be managed by a network specific gateway 130. These gateways 130 can be interconnected at low levels, using open or proprietary technologies and communication pathways. Interconnecting these residential networks 212A, 212B, 212C permits a creation of a virtual residential network, which includes a geographical region covered by an aggregate of multiple residential networks 212A, 212B, 212C. Any services 132 implemented for or available to a residential network 212, can be implemented for or made available to a virtual residential network. Thus, device sharing shown in diagram 210 and roaming shown in diagram 214 can be implemented within a virtual residential area, as shown by diagram 216. Virtual residential networks can be implemented by configuring gateway 130 software/firmware without negatively impacting other components of a telecommunications network 100. In one embodiment, communications between gateways 130 can occur at the physical/link 186 layer.

Diagram 220 shows IP device 150, gateway 130, and a computing system of a service provider 222, each connected to a service infrastructure 250. The infrastructure 250 supports the providing of services. In one embodiment, infrastructure 250 can conform to an IP Multimedia subsystem (IMS) framework for delivering IP multimedia services in compliance with architectural specifics defined by the 3rd Generation Partnership Project (3GPP). As such, infrastructure 250 can have a horizontal control layer that isolates the access network from the service layer. Thus, from a logical architecture perspective, services 132 compliant with an IMS framework (one embodiment of infrastructure 250) need not have their own control functions, as the control layer is a common horizontal layer. In another embodiment, the service infrastructure 250 can be a 3GPP Generic Access Network (GAN), which provides system 100 with an ability to use the Internet to provide the "last mile" connection for a telephony device.

In one embodiment, the infrastructure 250 can conform to standards of a (SOA) for providing services, such as Web services. In such an embodiment, the SOA infrastructure 250 provides a loosely-integrated suite of services 132 that can be used within multiple business domains. SOA separates functions into distinct units (e.g., services 132), which developers make accessible over a network in order to allow users to combine and reuse them in the production of applications. These services and their corresponding consumers communicate with each other by passing data in a well-defined, shared format, or by coordinating an activity between two or more services. In an SOA embodiment, a wide range of technologies can be used in the infrastructure 250 including, but not limited to, Simple Object Access Protocol (SOAP), Remote procedure call (RPC), Representational State Transfer (REST), Distributed Component Object Model (DCOM), The Common Object Request Broker Architecture (CORBA), Data Distribution Service for Real-time Systems (DDS), Web services, Windows Communication Foundation (or WCF), and/or combinations and derivatives thereof.

In one embodiment, the infrastructure 250 can be an Intelligent Network (IN) infrastructure. In an IN embodiment, services can execute at the service layer, which is distinct from the switching layer of the core network. Services implemented in an IN framework can conform to the Signaling System 7 (SS7) protocol. An IN infrastructure (an embodiment of infrastructure 250) as used herein includes IN derivatives and extensions, such as an Advanced Intelligent Network (AIN), Customised Applications for Mobile networks Enhanced Logic (CAMEL), Next Generation Intelligent Network (NGIN), and the like.

Regardless of specifics, the service infrastructure 250 can include numerous components, such as a service bus 252, usage meters 253, performance monitors 254, performance adjusters 255, and the like, which facilitate the use, monitoring, and monetization of services 132. Further, in one embodiment, the service infrastructure 250 can support and enforce service level agreements (SLA) 223 for services 132. Each SLA 223 can be a service contract, where a level of service 132 is formally defined. Infrastructure 250 can be an adaptive one, which ensures SLA 223 contracts are upheld by providing priority handling of services 132. SLA 223 may specify the levels of availability, serviceability, performance, operation, or other attributes of the service, such as billing.

As noted from the various embodiments of infrastructure 250, services 132 can take many different forms. They can include IN services, SOA services, IMS services, Web services, and the like. Further, services 132 can be provided by a carrier 112 and/or by an independent service provider 222. Services 132 can be implemented at the gateway 130, which may involve use of plug-ins 242 and communications across APIs 244. Thus, services 132 can establish, modify, interoperate with, and extend applications 240 running on gateway 130.

Services 132 can also be designed for specific IP devices 150, and can therefore establish, modify, interoperate with, and extend client-side applications 230. Device 150 applications can also use plug-ins 232, APIs 234, and the like. Further, services 132 can execute in network attached servers operating independently of and remote from device 150 and/or gateway 130.

The various computing devices 121-126, resource 170-174, gateway 130, service provider 220 devices, network components, and the like can include hardware 270 and computer program products 280, as shown by device 260. Device 260 can represent general purpose machines (e.g., running a general purpose operating system (OS) 283 having functionality determined largely by applications 284 and modules 285 running on top of the OS 283) as well as special purposed machines (e.g., having custom hardware, electronic circuits, firmware, and software tailored for a specialized purpose, which may be designed to prevent significant post-sale modifications). The computing devices 260 can include distributed devices formed from a plurality of discrete machines, which may be geographically separated from one another, yet which function as a single device. A distributed device can have optionally implement fault-tolerance, fail-over, and load balancing technologies. Additionally, the computing device 260 can include a virtual device (created using virtualization technologies), which emulates a physical device within a layer of abstraction functioning above a hardware layer. As such, multiple virtual devices can be formed from a single physical device (or from a set of M physical devices to N virtual devices).

The hardware 270 can include a processor 272, non-volatile memory 273, volatile memory 274, network transceiver 275, input/output (I/O) peripherals 276, and/or the like. The components 272-276 can be connected to each other via bus 277.

Computer program products 280 can include software, firmware, and combinations thereof. The computer program products 280 can be stored in a tangible storage medium (e.g., memory 273, 274) and can be executed on the hardware 270 (e.g., instructions of the products 280 can execute within the processor 272). The computer program products 280 can include boot firmware 282, an operating system 283, a set of applications 284, zero or more modules 285, an optional user interface 286, and combinations thereof. In some device 260 embodiments, functionality of the firmware 282, operating system 283, applications 284, and/or module 285 can be joined into a single unit, which may be implemented in hardware or firmware.

Figure 3:
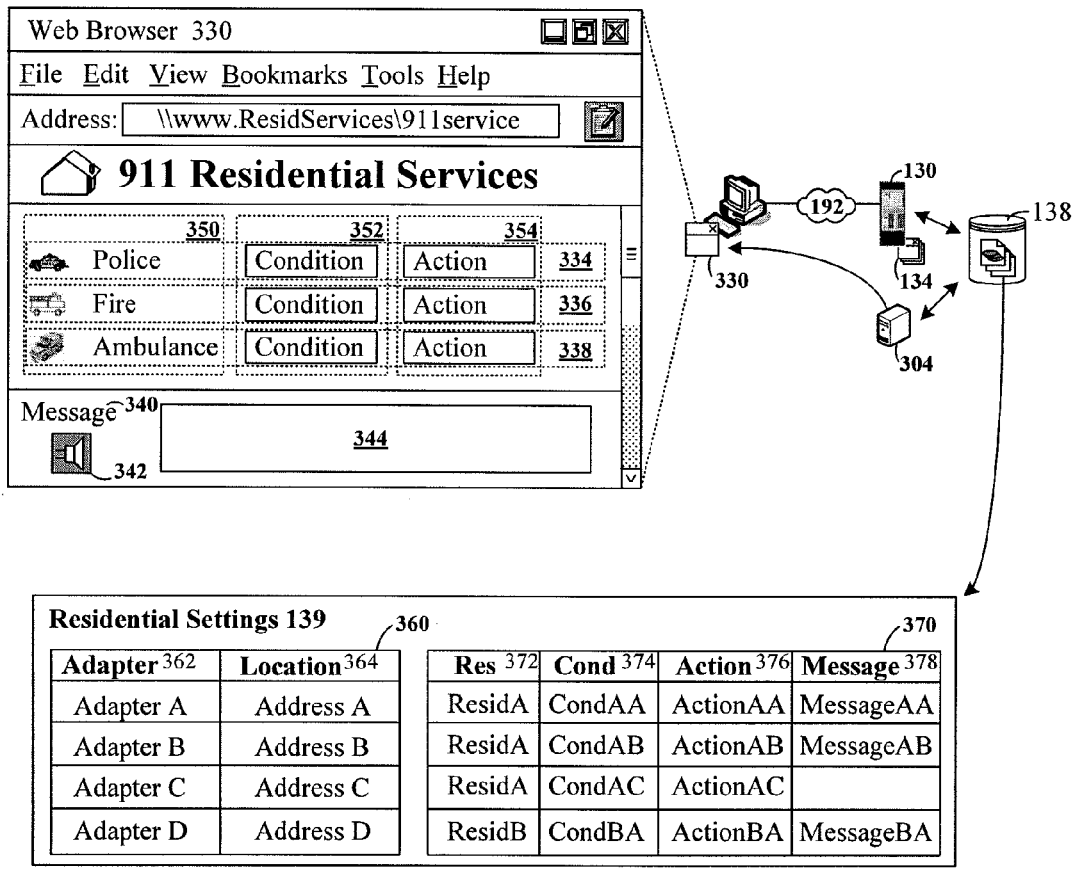
FIG. 3 is a diagram illustrating emergency (e.g., 911) services provided in accordance with an embodiment the disclosure.

FIG. 3 is a diagram illustrating emergency (e.g., 911) services 134 provided in accordance with an embodiment the disclosure. Specifically, any of the IP devices 150 (including devices 126 connecting to an adapter 129 via a converter 127) can permit a user to contact emergency response agencies 314. The emergency services 134 include 911 services, equivalent (or even the same as) dialing "911" from a POTS connected telephone. In the disclosure, however, all IP devices 150 can be enabled for the emergency services 134. These services 134 can be dependent upon the adapter 129 can be conveyed through the multi-access gateway 130, where configured settings 139 can be accessed and applied.

The devices 312 of responders can include telephony devices, computers, and any other configured resource 170-174, designed to inform emergency response agencies 314 of a situation. The emergency response agencies 314 can include public agencies (police 316, fire 317, hospital 318 agencies, etc.) as well as private ones (e.g., security company, a home maintenance service, notify one or more proximate neighbor(s), inform a remotely located home-owner, etc.). Different agencies 314 can be notified of different emergency situations, and multiple different agencies 314 can be informed of a single emergency event. Designation of the agencies 314 and emergency events can be configured by an authorized resident, such as through user interface 330, in one embodiment of the disclosure.

Emergency events can be manually triggered by a device 150 user and/or can be automatically triggered by a detected or sensed situation (such as a smoke detector or security alarm within a residence 110—each of which can be in-residence devices 150—being activated). In one embodiment, some automatically triggered emergency actions can concurrently initiate a designated resident to be notified. In one embodiment, this notification can occur a fixed period before emergency service agencies 314 are contacted so that the designated resident can explicitly authorize or refute an emergency service action. In such a situation, if a designated resident fails to respond within a designed time period, the emergency response action can be automatically initiated.

In one embodiment, an emergency response agency 314 can be automatically provided with in-residence information (e.g., a camera feed, a status of in-residence sensors, etc.) whenever an emergency response communication is sent to that agency 314. A previously established address 364 of the residence 110 from which the emergency service 134 communication was placed can be part of provided in-residence information. This address 364 can be based on the adapter 129 location, the device 150 location (e.g., especially for GPS equipped devices), or a combination thereof. Providing the in-residence information can minimize an amount of time potentially distressed residents spend on an emergency response communication and can substantially aid responders 314 in taking appropriate and timely actions, which represents a win-win situation for both residents and responders.

In one embodiment, indicated by diagram 310, the in-residence 110 device 150 can connect through the adapter 129 over network 192 to gateway 130. Gateway 130 can enable the emergency services 134, which provides a connection to emergency response agency 314 devices 312.

In one embodiment, indicated by diagram 320, the adapter 129 can be linked to multiple networks 192, 144; one (192) connected to the gateway 130; the other (144) connecting directly to an emergency response agency 314 device 312.

This permits emergency response calls to be made, directly from the adapter 129, even when connectively to network 192 is compromised. This arrangement (of diagram 320) can also negate traditional location problems with making 911 calls from IP devices 150, as the alternate communication 203 can be via a traditional mechanism, such as a land telephony line. This is not an imposed limitation of communication 203, which can include a wireless telephony service (perhaps conducted via an in-residence device 150, like a cell phone, liked to adapter 129), and other alternative communication lines. When an alternative communication line 203 is used, in-residence information can still be provided by the gateway 130 to one or more agencies 314, such as over a public 142 or private 140 IP network. In one embodiment, 911 calls can be placed directly from the adapter 129 or from any IP device 150 connected to the adapter 129, either situation resulting in line 203 being used during the emergency service communication.

As previously noted, emergency service 134 can be highly configurable by a designated resident having administrative privileges. Residence specific settings 139 can be stored in a data store 138 accessible by the multi-access gateway 130. In one embodiment, a Web server 304 can provide a Web page 332 or other user interface 330, which an authorized user can utilize to modify the residential settings 139. For example, the interface 330 can permit a user to designate a set of emergency response agencies 350 (e.g., agencies 314), as well as a set of conditions 352 under which specific response agencies 314 will be contacted. Further, actions 354 to be taken in response to an emergency situation satisfying the conditions 352 can be customized via interface 330. Additionally, one or more customized messages 340, which can include audio 342, text 344, or other content can be established, which are to be automatically conveyed upon an occurrence of a related emergency situation.

For example, in a health related emergency 338, the text 344 can include to a responder 318 medical facts about residents, such as blood type, health conditions, drug allergies, current prescription medications, etc. In another example, in a police situation 334, the actions 354 can authorize police 316 to receive presence information (such as user location as determined by GPS components of a mobile device, or scheduled locations from calendaring programs) related to the residents of the residence 110, which would be otherwise unavailable to the police 316. In another example, in a fire situation 336, the message 340 can selectively provide response personnel 317 with residence 110 layouts, access codes, and other such information.

Information established via interface 330 can be stored in appropriate tables 360, 370. In one embodiment, some of the information in tables 360, 370 can be established by a carrier 112 or a provider 220 of an emergency service, and may not be modifiable by a resident.

As indicated in table 360, physical locations 364 of adaptors 362 can be maintained, which provides a reliable means for locating where an emergency response service 134 was initiated. In one embodiment, this information can be supplemented by GPS information of in-residence devices 150 (where adapter 129 can optionally include a GPS component), and may be stored in a memory of adapter 129 and/or in data store 138.

As indicated in table 370, residence 372 specific information can be maintained. For each residence 372 a set of conditions 374, actions 376, messages 378, and the like can be maintained, which are utilized when an emergency service 134 is activated.

Figure 4:
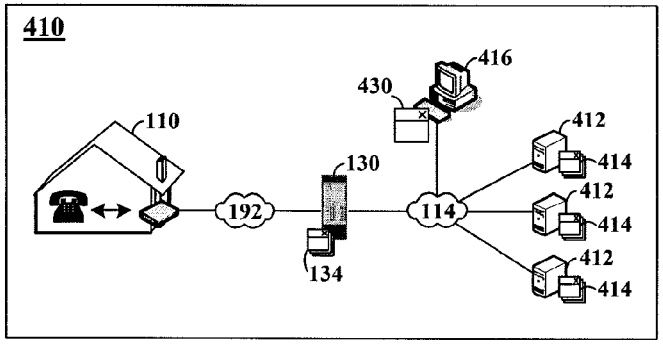
FIG. 4 is a diagram illustrating home control services provided in accordance with an embodiment the disclosure.
Figure 4:
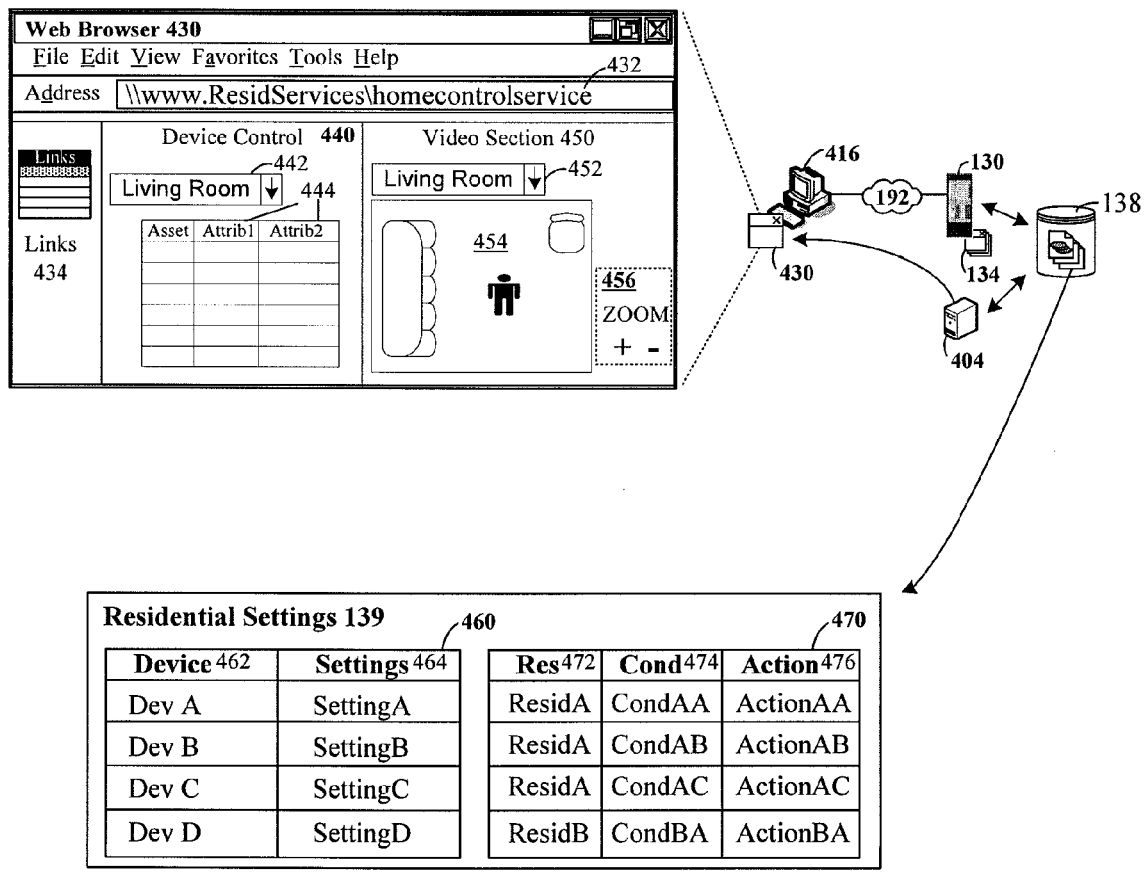

FIG. 4 is a diagram illustrating home control services 135 provided in accordance with an embodiment the disclosure. The home services 135 are provided to the residences 110 over network 192, which is connected to adapter 129 and gateway 130. In-residence devices 150 can include sensors, actuators, and the like, which monitor and control in-residence 110 devices. For example, electric outlets, heating/cooling devices, lights, cameras, and the like can all be controlled by the home control services 135. A device 416 (which can be an in-residence device 150 or not) can include a user interface 430 through which settings 139 of home control services 135 can be viewed and edited. In one embodiment, a number of servers 412 connected to gateway 130 via network 114 can provide one or more services 414. These services 414 can enhance basic home control services 135, and/or can be third party home control services (135), which are made available to residents via gateway 130.

In one embodiment, the user interface 430 for services 135 can be provided within a Web browser of a client 416 device, where the interface 430 includes a Web page 432 served by a Web server 404. This server 404 can access residence 110 specific settings 139 and can even permit a designated resident to modify the settings 139. A home control 432 interface can aggregate different services 414 provided by different providers, each of which can include a link 434 to the relevant content. For example, a device control 440 section can permit a user to view in-residence devices 150 by room 442. Settings per device 150 can then be adjusted via interface controls 444.

Various specialized sections can exist within the interface 430 for specific types of in-residence devices. For example, a video section 450 can permit viewing of video captured by in-residence 110 cameras (each of which can be an IP device 150 or connected to one). Thus, a user can view 454 any room 452 of a residence 110 via a browser, and use controls 456 to control the in-residence 110 devices 150. A level of control and the number of home control services 135 for each residence 110 is arbitrary and can be tailored to suit market and residence needs.

The residential settings 139 for home control services 135 can include any of a variety of data elements, a few of which are expressed by tables 460 and 470. Table 460 shows a set of in-residence devices 462 and their current settings 464. Table 470 shows a set of different residences 472, conditions 474 related to home control devices that are enabled, and actions 476 to be taken upon the satisfaction of these conditions 474.

It should be appreciated that the configurations, interfaces, and services 134, 135 expressed in FIGS. 3 and 4 are presented to illustrate concepts expressed herein and are not to be construed as a limitation on the scope of the disclosure.

In one embodiment, the residential administration services 136 can provide a mechanism for residents, carrier 112 administrators, service providers 220, and other authorized persons to modify residence specific settings 139 and other details of the services 132. As such, user interfaces 330, 430 represent two contemplated interfaces that are provided as part of the residential administration services 136. In one embodiment, services 136 permit a resident to subscribe to new services, to modify behavior of existing services, and/or to cancel services received. These services can include Web services, IMS services, and/or IN services provided by the carrier 112 and by any of a variety of third party providers 220.

The data services 133 can take advantage of the preferred positioning of the gateway 130 compared to the IP devices 150 relative to a communication backbone. As such, a data storage space positioned at the gateway 130, or within a network 114 close to the communication backbone and having significant bandwidth (relative to network 129) can assist in reducing traffic over the last-mile of the communication backbone. This can be advantageous to the carrier 112, who receives efficiencies by minimizing last-mile traffic and the residents, who experience increased performance, a reduction of latencies, and the like. Data services 133 can be provided by carrier 112 and by service providers 220 for a fee. Data services 133 can include AMAZON'S S3 service, data backup services, cloud-based storage drives, and the like. Customizable cloud-based application services (not shown) can also be integrated with the data services 133 in one contemplated embodiment.

Other services 137 can be designed to take advantage of the positioning of the multi-access gateway 130 and the quantity of residences 110 and devices 150 accessible via the gateway 130. There is virtually no limit on the types and configuration of these services, which represent an emerging new market.

In one illustration, the other services 137 can include a baby monitoring service. This assumes a microphone and/or camera is positioned within a room of a residence 110 proximate to a baby. These devices (camera/microphone) can be connected directly to the gateway 130, as can output devices, such as a television, a computer, a speaker, cell phone, etc. Sound/video from the devices in the baby's room can be directed to any of the output devices, as determined by the routing functionality 162 of the gateway 130. The output devices need not be in the same physical location as the residence 110. For example, a mother visiting a neighbor can receive baby monitoring output via a mobile phone, or even through an IP device located in the neighbor's home (assuming it is also linked to gateway 130). Additionally, programmatic services, which trigger alerts when a baby is crying, leaving a room, falling from a crib, etc. can be implemented by service providers 220 to enhance a basic baby monitoring service (other service 137). As can be seen, any type of service 137 can be implemented, which takes advantage of multiple residences 110 and devices 150 being linked to the multi-access gateway 130.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing residential telecommunication services comprising:
    connecting a plurality of different internet protocol (IP) devices within hundreds of different residences via in-residence adaptors, wherein one adaptor exists for each of the hundreds of different residences, said adaptor being customer premise equipment (CPE) lacking routing capabilities;
    communicatively linking each of the adaptors to a remotely located multi-access gateway controlled by a carrier, wherein the multi-access gateway is part of the middle-mile of a communication network, wherein the multi-access gateway provides routing directly to IP addresses of each of the plurality of IP devices without any intermediate gateways;
    conducting TCP/IP based communications between each of the IP devices and the multi-access gateway, said communications occurring through the adapters at the link level of the TCP/IP stack, where the conducted TCP/IP based communications through the adaptor do not occur above the link layer of the TCP/IP stack;
    providing, through the multi-access gateway, a plurality of telecommunication services to the residences, wherein said telecommunication services comprise emergency services for the IP devices, and wherein the multi-access gateway controls access by each residence to the telecommunication services, to allow any of the telecommunication services to be initiated, modified, or terminated by a carrier maintaining the multi-access gateway on a per residence basis for any of the different residences;
    storing customizable residence specific settings for each of the residences in a data store accessible by computing equipment able to control residence specific behavior of the multi-access gateway, wherein said customizable residence specific settings determine details of the telecommunication services as provided to specific ones of the residences;
    generating an emergency report about an emergency incident triggered by one of the IP devices; and
    posting the emergency report to a Web page to be shared by all individuals in a residence related to the emergency report, wherein the Web page is accessible by a Web browser.

2. The method of claim 1, wherein each of the IP devices comprises an IPv6 compliant IP address, wherein the multi-access gateway directly communicates with each of the IP devices via an IPSec compliant communication channels.

3. The method of claim 1, wherein the plurality of telecommunication services are services regulated by the Federal Communication Commission under a federally established communication statute.

4. The method of claim 1, further comprising:
providing emergency services for each of the IP devices, wherein location information used for the emergency services is dependent upon the adaptor through which the IP devices connect, and wherein all initiated emergency services from any of the IP devices are initially conveyed to the multi-access gateway before being sent to an emergency response agency.

5. The method of claim 1, further comprising:
the carrier providing a user interface accessible by client-side browsers, wherein said user interface permit authorized users residing in the residences to modify at least a portion of the customizable residence specific settings for one of the residences in which the authorized user resides.

6. The method of claim 1, wherein the telecommunication service comprise data service for the residences, wherein the data services permit a user to upload data to a gateway data store local to the multi-access gateway, which is thereafter accessible as being served from the residence to others outside the residence, thereby avoiding the last-mile communications between the multi-access gateway and the IP devices, which provide less upstream bandwidth than is available from the gateway data store.

7. The method of claim 1, wherein said telecommunication services include are configured to utilize IN services, IMS services, and Web services, each configured on a per-residence basis and controlled and implemented through the multi-access gateway.

8. The method of claim 1, wherein the connecting, the communicatively linking, the conducting, the controlling, the storing, and the providing are performed by at least one computer program when the at least one computer program is executed on the one client, wherein the at least one computer program is stored in a tangible, non-transitory storage medium.

9. A carrier-side method for providing telecommunication services comprising:
communicatively linking a plurality of different residences to a communication backbone via a multi-access gateway, wherein each residence comprises an adapter through which a plurality of IP devices directly connect to the multi-access gateway via IPSec compliant communication channels, wherein the multi-access gateway performs TCP/IP network level routing for the IP devices, wherein the highest TCP/IP level communication performed by the adapter is link level communications;
the multi-access gateway connecting each of the IP devices to remotely located resources, which comprise remotely located IP resources, which communicate to the IP devices via IP addresses maintained by the multi-access gateway; and
providing telecommunication services to the IP devices in the residences, wherein said telecommunication services comprise emergency services for the IP devices, and wherein the multi-access gateway controls access by each residence to the telecommunication services, to allow any of the telecommunication services to be initiated, modified, or terminated by a carrier maintaining the multi-access gateway on a per residence basis for any of the different residences;
storing customizable residence specific settings for each of the residences in a data store accessible by computing equipment able to control residence specific behavior of the multi-access gateway, wherein said customizable residence specific settings determine details of the telecommunication services as provided to specific ones of the residences;
generating an emergency report about an emergency incident triggered by one of the IP devices; and
posting the emergency report to a Web page to be shared by all individuals in a residence related to the emergency report, wherein the Web page is accessible by a Web browser.

10. The method of claim 9, further comprising:
the carrier providing a user interface accessible by client-side browsers, wherein said user interface permit authorized users residing in the residences to modify at least a portion of the customizable residence specific settings for one of the residences in which the authorized user resides.

11. The method of claim 9, wherein said telecommunication services include are configured to utilize IN services, IMS services, and Web services, each configured on a per-residence basis and controlled and implemented through the multi-access gateway.

12. The method of claim 11, wherein at least a portion of the IN services, IMS services, and Web services are provided by third parties configured by subscribers of the telecommunication services users in the residences through use of the residential administration services.

13. The method of claim 9, wherein at least a portion of said adaptors comprises a wired telephony connector, which links the adaptor to a POTS network through an emergency channel that is not routed through the multi-access gateway; said method further comprising:
detecting at the multi-access gateway when any of the IP devices initiates an emergency service;
determining an adapter that the IP device that initiated the emergency service communicated through;
the multi-access gateway initiating a communication over the emergency channel of the determined adapter; and
permitting communications between the residence having the determined adapter and a emergency response agency via the emergency channel.

14. The method of claim 9, wherein at least a portion of the adapters comprise a wireless transceiver for personal area network communications, and wherein at least a portion of the IP devices comprise wireless IP devices having wireless transceivers able to wirelessly communicate with the wireless transceivers of the adapters, said method further comprising:
permitting each of the wireless IP devices receiving telecommunication services through the multi-access gateway to roam a wireless coverage area formed by the plurality of adapters having wireless transceivers, wherein one of the telecommunication services provided by the carrier selectively enables and disables an ability to roam the wireless coverage area.

15. The method of claim 9, wherein at least a portion of said adapters are positioned on an exterior of a corresponding residence in a locked box not directly accessible by a resident, but accessible by an agent of the carrier providing the telecommunication services.

16. The method of claim 9, wherein the communicatively linking, the connecting, and the providing are performed by at least one computer program when the at least one computer program is executed on the one client, wherein the at least one computer program is stored in a tangible, non-transitory storage medium.

17. The method of claim 9, further comprising:
reserving a block of IPv6 addresses at the multi-access gateway for the IP devices; the multi-access gateway utilizing computer programs and a database to assign each of the different IP devices to different ones of the IPv6 addresses in the reserved block;
associating different ports of the multi-access gateway to different dedicated communication channels terminating in the IP devices having the assigned IPv6 addresses; and
maintaining and continuously updating the database of IPv6 addresses that correspond to different ports of the multi-access gateway.

18. The method of claim 9, further comprising:
the multi-access gateway detecting an occurrence of an emergency event within a residence;
responsive to the detection of the emergency event, the multi-access gateway halting existing processes from the residence not related to the emergency event and disabling communication channels to devices unrelated to the emergency event;
handling the emergency event; and
once the emergency event is handled, resuming the halted processes and enabling the disabled communication channels.

19. The method of claim 9, further comprising:
uploading and storing emergency location information at the multiple-access gateway, wherein the emergency location information comprises audio and text; and
upon receiving an indication of an emergency event, the multiple-access gateway sending the emergency location information about a residence associated with the emergency event to a responder for the emergency event, wherein the emergency location information comprises at least a name of a resident and an address of the residence.

20. The method of claim 9, further comprising:
upon detecting an emergency event for a residence, the multiple-access gateway automatically providing a dial tone to at least one of the IP devices exclusively for dialing out 911.

21. The method of claim 9, further comprising:
selectively uploading emergency information to the IP devices; and
presenting an indicator on the IP devices indicating whether or not the emergency information was successfully uploaded to the IP devices.

22. A system for providing telecommunication services comprising:
a multi-access gateway controlled by a carrier, the multi-access gateway comprising hardware, a processor, a plurality of ports, and at least one tangible storage medium comprising software or firmware executable by the processor, wherein the multi-access gateway performs TCP/IP network level routing for a plurality of in-residence IP devices, the multi-access gateway connecting each of the in-residence IP devices to remotely located resources, which comprise remotely located IP resources, which communicate to the in-residence IP devices via IP addresses maintained by the multi-access gateway;
a plurality of adaptors comprising hardware, each adaptor residing within a different residence, each adaptor for connecting a subset of the in-residence IP devices that are in the corresponding residence directly to the multi-access gateway via IPSec compliant communication channels, wherein the highest TCP/IP level communication performed by the adapter is link level communications, the system providing telecommunication services to the in-residence IP devices, the telecommunication services comprising emergency services for the IP devices, wherein:
the multi-access gateway stores customizable residence specific settings for each of the residences in a data store accessible by computing equipment able to control residence specific behavior of the multi-access gateway, wherein said customizable residence specific settings determine details of the telecommunication services as provided to specific ones of the residences;
the multi-access gateway controls access by each residence to the telecommunication services, to allow the carrier to initiate, modify, or terminate the telecommunication services on a per residence basis for any of the different residences; and
the multi-access gateway generates an emergency report about an emergency incident triggered by one of the IP devices and posts the emergency report to a Web page to be shared by all individuals in a residence related to the emergency report, wherein the Web page is accessible by a Web browser.

* * * * *